United States Patent [19]

Kawasaki et al.

[11] 4,035,700
[45] July 12, 1977

[54] ELECTRONIC CONTROL APPARATUS

[75] Inventors: Itaru Kawasaki, Minoo; Kouichi Yamaguchi, Hirakata; Yoshiaki Igarashi, Neyagawa; Kazutsugu Kobayashi, Takatsuki, all of Japan

[73] Assignee: Matsushita Electric Industrial Co., Ltd., Kadoma, Japan

[21] Appl. No.: 640,265

[22] Filed: Dec. 12, 1975

[30] Foreign Application Priority Data

Dec. 20, 1974 Japan .......................... 49-147074

[51] Int. Cl.$^2$ ....................................... H02K 29/00
[52] U.S. Cl. ............................... 318/138; 318/254
[58] Field of Search .......... 318/138, 254, 685, 696, 318/227, 230, 231

[56] References Cited

U.S. PATENT DOCUMENTS 3,784,888  1/1974  Geiersbach et al. ............. 318/138

Primary Examiner—Herman J. Hohauser
Attorney, Agent, or Firm—Wenderoth, Lind & Ponack

[57] ABSTRACT

An electronic control apparatus for controlling currents supplied to star-connected multiphase loads. The apparatus has two sets of switching means, a reference signal source, a voltage detector for detecting the voltage of the common terminal of the star-connection, a comparator for comparing the outputs of the voltage detector and the reference signal source, a feedback amplifier for amplifying the output of the comparator, a load current supplying means for supplying a current to the multiphase loads through one set of the two sets of the switching means according to a command signal, a feedback current draining means coupled to the feedback amplifier and the other set of the two sets of the switching means, and a timing signal generator for selectively switching the two sets of the switching means, wherein the feedback current draining means drains the current through said other set of switching means from the multiphase loads so as to keep the voltage at the common terminal of the star connection constant or substantially constant regardless of the mode of the timing signal generator.

7 Claims, 19 Drawing Figures

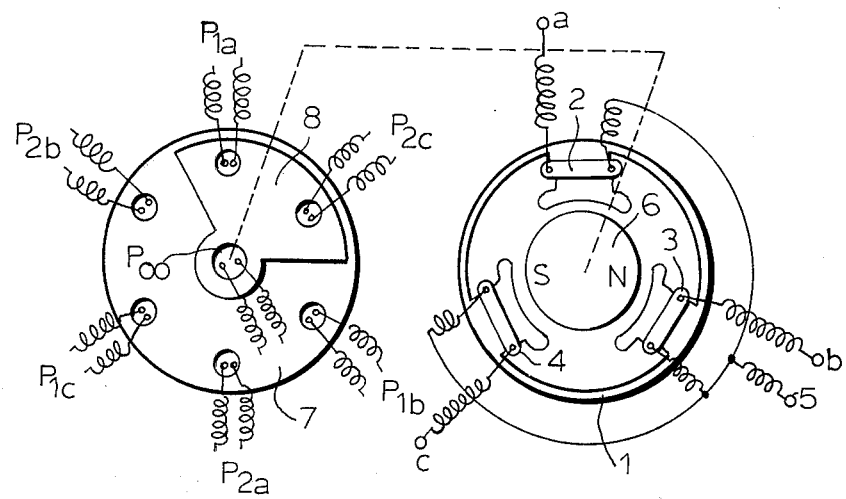
(PRIOR ART)
FIG. 1
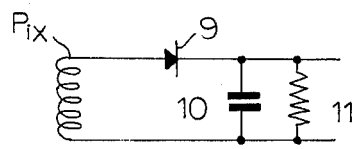
(PRIOR ART)
FIG. 2 (1)
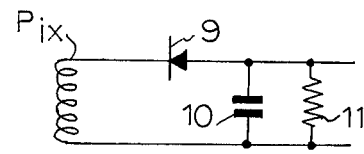
(PRIOR ART)
FIG. 2 (2)
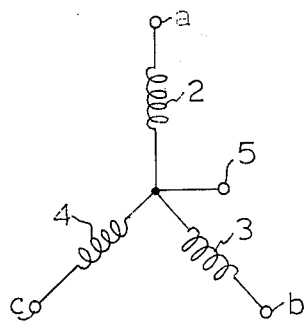
(PRIOR ART)
FIG. 3 (1)
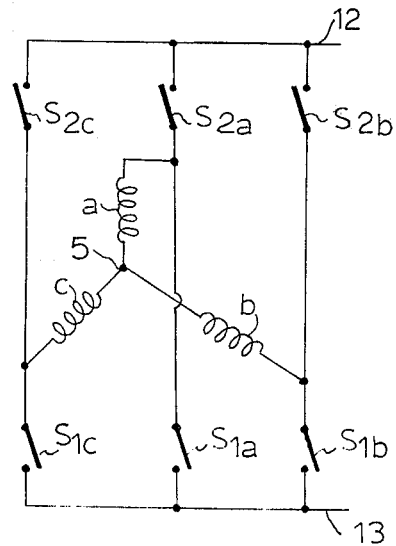
(PRIOR ART)
FIG. 3 (2)

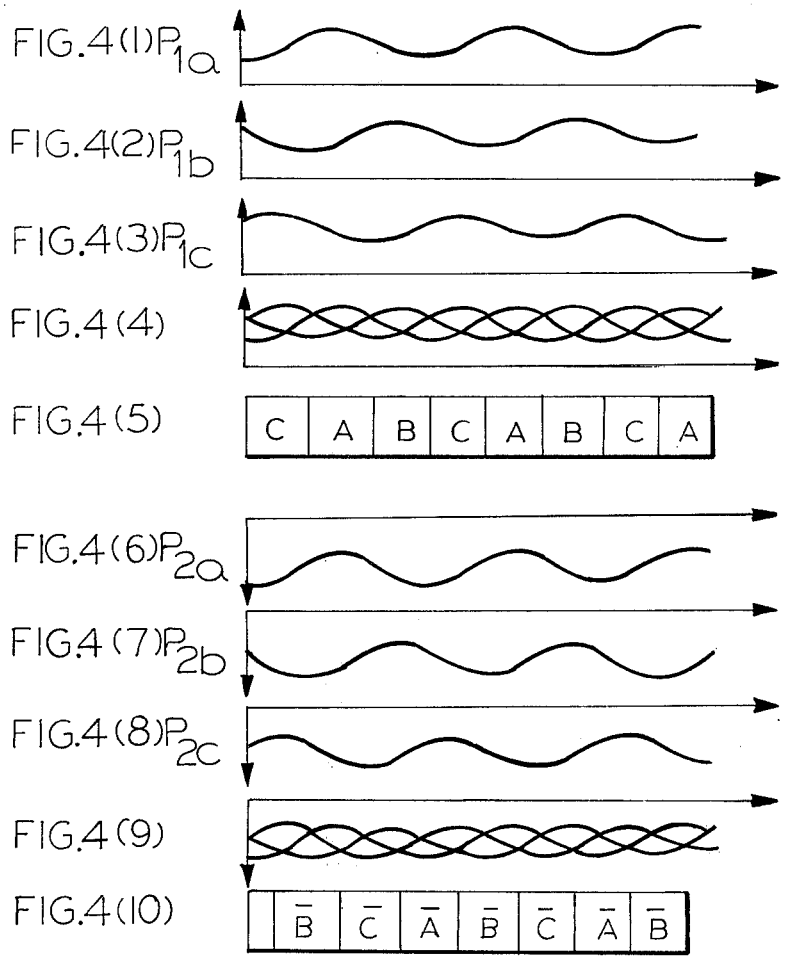

ELECTRONIC CONTROL APPARATUS

This invention relates to an electronic control apparatus for controlling currents supplied to star-connected multiphase loads, for example, the multiphase loads in a brush-less D.C. motor.

According to a conventional electronic control apparatus for controlling currents supplied to star-connected multiphase loads, which are e.g. in a motor driven by full-wave signals, the terminal of each of the multiphase loads opposite to the common terminal of the star connection of the multiphase loads is connected to one current supplying means through each of one set of switching means and also connected to a further current supplying means through each of a further set of switching means. By designing each of the two sets of switching means to achieve differential operation, the two sets of switching means can flow a current through the common terminal of the star connection selectively and time sequentially. In such an apparatus, it is theoretically possible to keep the selectively and time sequentially flowed current constant, and to avoid current flow through unselected loads and also to switch current flow through the loads precisely. However, occasionally this theoretical operation cannot be achieved in practuce due e.g. to the difference between the current commanded by one current supplying means and the current commanded by further current supplying means. If the multiphase loads are those in a motor, the characteristics of the motor operation are deteriorated by the undesired flow of load currents.

It is an object of this invention to provide an electronic control apparatus for controlling currents supplied to star-connected multiphase loads, by which the current selectively and time sequentially supplied to the multiphase loads can be switched precisely and the current flow through unselected loads can be avoided, and the existence, in operation, of a time period when there is an overlapping current flow in differential operation.

This object is achieved according to this invention by providing an electronic control apparatus for controlling currents supplied to star-connected multiphase loads, comprising: a plurality of first switching means; a plurality of second switching means, one terminal of each of the loads opposite to the common terminal of the star-connection being connected to a corresponding one of the plurality of first switching means and to a corresponding one of the plurality of second switching means; a reference signal source for generating a reference signal; a voltage detector coupled to the common terminal of the star-connection for detecting the voltage of the common terminal; a first comparator coupled to the voltage detector and to the reference signal source for providing an output signal equal to the difference between the outputs of the voltage detector and the reference signal source; a first feedback amplifier coupled to the first comparator for amplifying the output signal of the first comparator; load current supplying means coupled to the first switching means for supplying a current to the multiphase loads according to a command signal through the first switching means; feedback current draining means coupled to the first feedback amplifier and the second switching means; and a timing signal generator coupled to the plurality of first switching means and the plurality of second switching means for selectively switching the plurality of first switching means and the plurality of second switching means, wherein the feedback current draining means drains the current through the second switching means from the multiphase loads so as to keep the voltage at the common terminal of the star-connection constant or substantially constant regardless of the mode of the timing signal generator.

According to a further development of this invention, the above-mentioned load current supplying means has a high output impedance to be coupled to the first switching means and to supply the current to the multiphase loads according to the command signal through the first switching means.

According to a still further development of this invention, the electronic control apparatus further comprises: a plurality of first load current amplifiers coupled respectively between the first switching means and the terminals of the star-connection opposite to the common terminal of the star-connection for amplifying the current supplied through the first switching means by the load current supplying means and providing the output current to the multiphase loads; and a plurality of second load current amplifiers coupled respectively between the second switching means and the terminals of the star-connection opposite to the common terminal of the star-connection for amplifying the current drained through the second switching means by the feedback current draining means and draining the output current from the multiphase loads.

According to another development of this invention, the load current supplying means in the electronic control apparatus according to the above-mentioned still further development of this invention comprises: a second comparator; a second feedback amplifier coupled to the second comparator and to the first switching means for amplifying the output of the second comparator and providing the current to the multiphase loads through the first switching means; and a load current detector coupled between the plurality of first load current amplifiers and the second comparator for detecting the total current of the multiphase loads, wherein the second comparator provides an output signal equal to the difference between the output of the load current detector and the command signal to provide the current to the multiphase loads according to the command signal through the first switching means.

According to yet another development of this invention, the load current supplying means in the electronic control apparatus according to the above-mentioned still further development of this invention comprises: a second comparator; a second feedback amplifier coupled to the second comparator and the first switching means for amplifying the output of the second comparator and providing the current to the multiphase loads through the first switching means; and a load current detector coupled between the plurality of second load current amplifiers and the second comparator for detecting the total current of the multiphase loads, wherein the second comparator provides an output signal equal to the difference between the output of the load current detector and the command signal to provide the current to the multiphase loads according to the command signal through the first switching means.

According to a further development of this invention, the timing signal generator generates such signals that only one of the plurality of first switching means and only one of the plurality of second switching means are switched on at a time.

According to a further development of this invention, the multiphase loads are phase windings of an electric motor and the timing signal generator is a commutating system of the electric motor.

Further objects and features of this invention will be described in detail hereinafter together with the accompanying drawings, in which:

FIG. 1 is a drawing schematically showing a known brushless D.C. motor;

FIG. 2(1) and FIG. 2(2) are circuit diagram of known circuits for rectifying and smoothing A.C. signals modulated according to rotational position;

FIG. 3(1) is a circuit diagram of a known star-connection of a stator winding;

FIG. 3(2) is a circuit diagram of a known switching means arrangement for driving the multiphase loads with full-wave signals;

FIGS. 4(1) to 4(10) are diagrams of waveforms of position signals and conduction phases of the multiphase loads;

Figure 7:
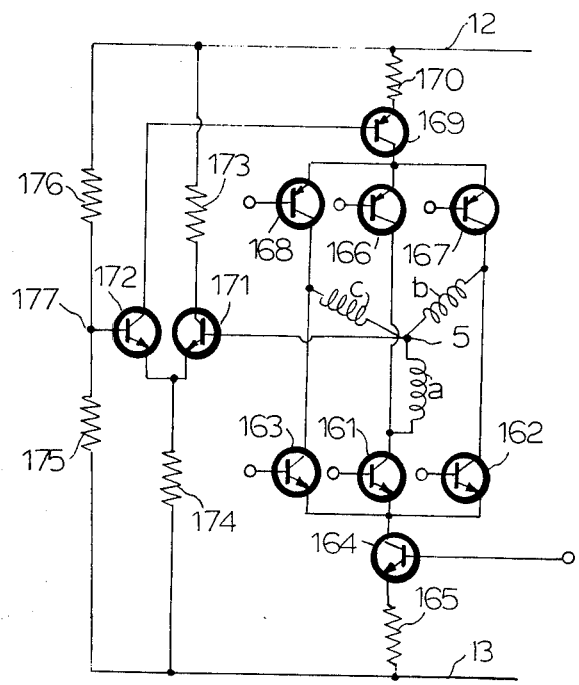
Figure 8:
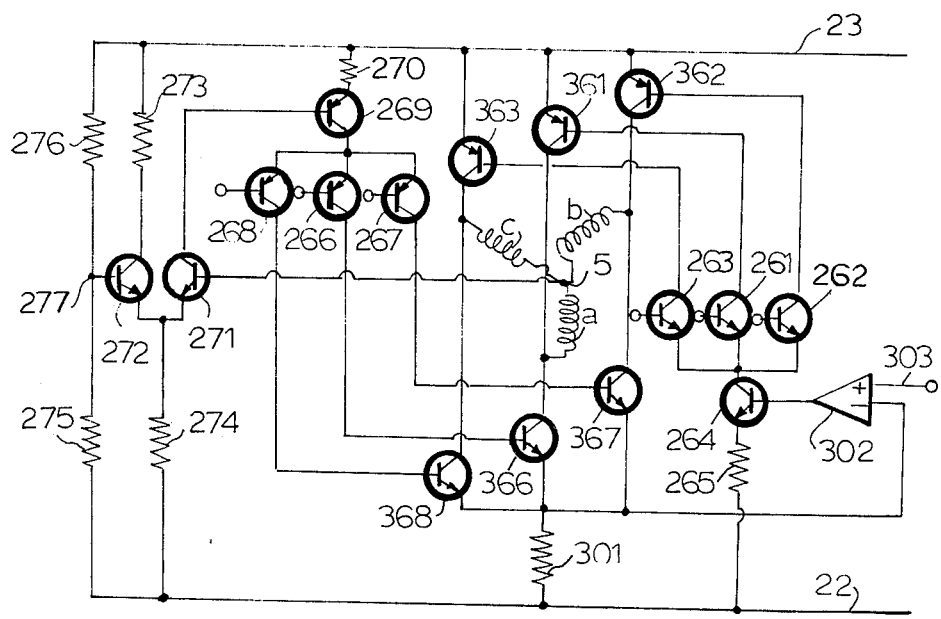

FIG. 7 is a circuit diagram of a circuit according to one example of the electronic control apparatus of this invention for completely switching the current of the multiphase loads with full-wave signals; and FIG. 8 is a circuit diagram of a circuit according to another example of the electronic control apparatus of this invention for completely switching the current of the multiphase loads with full-wave signals.

A typical known brushless D.C. motor is diagrammatically shown in FIG. 1. Referring to FIG. 1, stator windings 2, 3 and 4 are wound on stator poles arranged on the inside of a stator 1, as shown. The stator windings 2, 3 and 4 are star-connected to as to be a, b and c phases, respectively, with a common terminal 5 as shown in FIG. 3(1). A rotor magnet 6 is provided to rotate together with a distributor 8 for position detection coaxially arranged with a position detecting member 7 provided on the stator. A primary winding $P_{oo}$ for inducing an A.C. signal in the distributor 8 is provided in the vicinity of the rotational center of the distributor 8. Secondary windings $P_{1a}$, $P_{1b}$, $P_{1c}$, $P_{2a}$, $P_{2b}$ and $P_{2c}$ arranged on said position detecting member 7 for position detection are provided to receive said A.C. signals from the distributor 8 in accordance with the rotation of the rotor 6. The A.C. signals received by the secondary windings $P_{1a}$ to $P_{2c}$ are detected by the rectifying and smoothing circuits shown in FIG. 2. In FIG. 2, $P_{1x}$ represents each of the secondary windings $P_{1a}$ to $P_{2c}$, and the circuit rectifies the signals by a diode 9, and smooths said rectified signals with a capacitor 10 and a resistor 11. FIGS. 4(1), (2), (3), (6), (7) and (8) show the waveforms of the A.C. signals obtained by the secondary windings $P_{1a}$, $P_{1b}$, $P_{1c}$, $P_{2a}$, $P_{2b}$ and $P_{2c}$, respectively, and are position detecting signals observed through the rectifying and smoothing circuit when the rotor 6 of the motor rotates. FIGS. 4(1), (2) and (3) show output waveforms from a circuit such as shown in FIG. 2(1), and as FIGS. 4(6), (7) and (8) show output waveforms from a circuit such as shown in FIG. 2(2).

Figure 5:
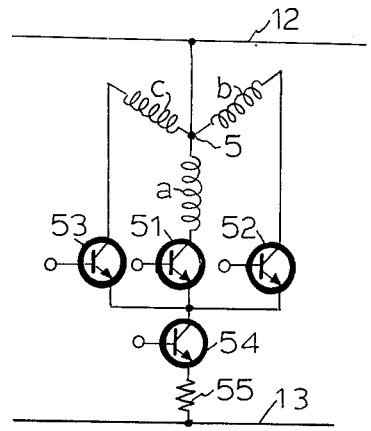
FIG. 5 is a circuit diagram of a known circuit for completely switching the current of the multiphase loads with half-wave signals.

FIG. 5 shows a known driving circuit for driving the multiphase loads (phase windings of a motor) by half-wave signals. In FIG. 5, the emitter of each of transistors 51, 52 and 53 is connected to the collector of a transistor 54, and the collectors of the transistors 51, 52 and 53 are connected to the terminals of the star-connected stator windings (a, b and c phases) opposite to the common terminal of the star-connection, as shown. The common terminal 5 of the star-connection is connected to a second voltage source 12, and the emitter of the transistor 54 is connected to a first voltage source 13 through a resistor 55. By applying a command voltage to the base of the transistor 54, a current commanded by said voltage is supplied to the emitters of the transistors 51, 52 and 53 from the collector of the transistor 54. The collector of the transistor 54 provides a high output impedance. By applying the signals such as shown in FIGS. 4(1), (2) and (3) together with an appropriate D.C. bias voltage to the bases of the transistors 51, 52 and 53, only one of the transistors 51, 52 and 53 that shows the highest base potential among the three is placed in a conductive state, and only this transistor allows a collector current to flow therethrough. The emitter potential follows the base potential of the transistor, through which the base current is flowing, according to the voltage difference of $V_{BE}$ ($V_{BE}$: potential difference between the base and the emitter). Therefore, the base-emitter voltage of each of the transistors through which the base current does not flow is lowered, and thus these transistors are placed in a deep cut-off state. Consequently, only the one transistor which is in the conductive state is in a completely conductive state.

However, around the time when the current flow in one of the three transistors 51, 52 and 53 is switched to another, there is a time when the base potentials of these two transistors subjected to this switching become substantially the same. At this time, both of these two transistors are in the conductive states, and the sum of the collector currents of these two transistors is equal to the collector current of only one of the transistors in a completely conductive state. This means that the circuit shown in FIG. 5 is a differential amplifier circuit in which the switching between two transistors is gradually achieved in accordance with the change of the base potentials of the two transistors. FIG. 4 (4) shows all of the base potentials of the transistors 51, 52 and 53, and FIG. 4 (5) shows the time periods when these transistors are in conductive states, wherein A, B and C represent the time periods (conduction phases) when the transistors 51, 52 and 53 are in conductive states. By using this differential amplifier circuit, an excellent switching operation can be attained in which there is no overlapping period when two adjacent conduction periods partially overlap each other and there is no dead period when none of the transistors is in a conductive state. Thus, where the multiphase loads a, b and c are those of an electric motor, the above-described differential amplifier circuit makes it possible to initiate the motor rotation without fail and to minimize the fluctuations of generated torque and of motor rotational speed. According to the above example, the position detection is carried out by using the change of modulation degree of A.C. signals, but it is known that similar results can be obtained by using, as the position detecting means, a Hall element, a magnetic resistance element, a photoconductive element, a photovoltaic element, etc.

A known motor driven by full-wave signals will be described hereinafter. Referring to FIG. 3 (2), the terminals of star-connected multiphase loads, a, b and c opposite to the common terminal 5 of the star-connection are connected to a first voltage source 13 through switches $S_{1a}$, $S_{1b}$ and $S_{1c}$, and to a second voltage source 12 through switches $S_{2a}$, $S_{2b}$ and $S_{2c}$, respectively. By using this circuit of FIG. 3 (2), a group of position detecting signals as shown in FIGS. 4 (1), (2) and (3), and a group of position detecting signals as shown in FIGS. 4 (6), (7) and (8) can be obtained. That is, two differential amplifier circuits are constructed by the two groups of position detecting signals. By the two differential amplifier circuits, conduction periods (conduction phases) as shown in FIG. 4 (5) and FIG. (10) can be obtained. FIG. 4 (9) shows all of the potentials of FIGS. 4 (6), (7) and (8). In FIG. 4 (5), A, B and C represent the conduction periods (conduction phases) of the loads a, b and c, respectively. In FIG. 4 (10), $\overline{A}$, $\overline{B}$ and $\overline{C}$ represent the conduction periods (conduction phases), in opposite phase, of the loads a, b and c. Therefore, the conduction periods are time sequentially switched from $\overline{B}\cdot A \rightarrow A\cdot\overline{C} \rightarrow \overline{C}\cdot B \rightarrow B\cdot\overline{A} \rightarrow \overline{A}\cdot C \rightarrow C\cdot\overline{B}$ . . . That is, in FIG. 3 (2), the switches $S_{1a}$ and $S_{2b}$, $S_{1a}$ and $S_{2c}$, $S_{1b}$ and $S_{2c}$, $S_{1b}$ and $S_{2a}$, $S_{1c}$ and $S_{2a}$, $S_{1c}$ and $S_{2b}$, . . . are time sequentially closed. If the rotor magnet 6 and the position detecting distributor 8 are arranged in an appropriate position with respect to each other, and the magnetic flux from the rotor magnet 6 effects the stator current effectively, the rotor 6 continues its rotation.

Figure 6:
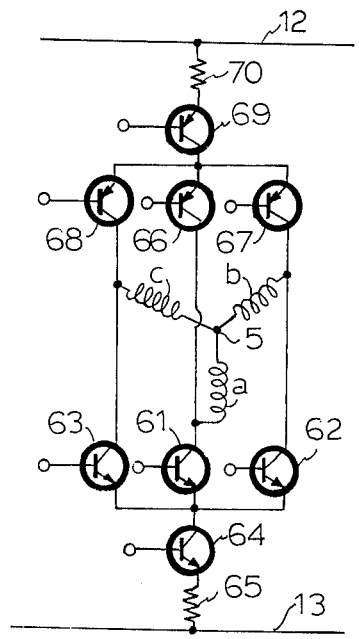
FIG. 6 is a circuit diagram of a known circuit for switching the current of the multiphase loads with full-wave signals.

FIG. 6 shows a known circuit constructed by applying the differential amplifier circuit shown in FIG. 5 to the circuit of FIG. 3. Referring to FIG. 6, a plurality of first transistors 61, 62 and 63 have the emitters thereof respectively connected to the collector of a transistor 64, and also have the collectors thereof connected to the respective star-connected stator windings (a, b and c phases), as shown. The emitter of the transistor 64 is connected to the first voltage source 13 through a resistor 65. A plurality of second transistors 66, 67 and have the emitters thereof respectively connected to the collector of a transistor 69, and also have the collectors thereof connected to the respective star-connected stator windings (a, b and c phases), as shown. The emitter of the transistor 69 is connected to the second voltage source 12 through a resistor 70. In accordance with the base potentials of the transistors 64 and 69, the flow of currents to the collectors of the transistors 64 and 69 are controlled. To the bases of the first transistors 61, 62 and 63, the potentials as shown in FIGS. 4 (1), (2) and (3) together with an appropriate D.C. bias voltage are applied, respectively. To the bases of the second transistors 66, 67 and 68, the potentials as shown in FIGS. 4 (6), (7) and (8) with an appropriate D.C. bias voltage are applied. Thereby, each of these two sets of transistors achieve a differential amplifying operation in the same manner as that explained above with reference to FIG. 5. In accordance with the base potentials of the transistors 64 and 69, currents flow through the collectors of the transistors 64 and 69. However, it is extremely difficult to make these two collector currents equal to each other. If said two collector currents are different from each other, the current corresponding to the difference between the two collector currents flows to the bases of the first transistors 61, 62 and 63 or to the bases of the second transistors 66, 67 and 68, resulting in the saturation of the transistors. For this reason, the differential amplifier circuits do not operate well. For example, partial overlapping between adjacent conduction periods occurs when switching of operating phases is carried out, and if the multiphase loads are those in an electric motor, the motor characteristics are deteriorated by the undesired operation of the differential amplifier circuits.

Therefore, the purpose of this invention is to provide an electronic control apparatus for controlling currents supplied to star-connected multiphase loads, in which the current unbalance between two current supplying means can be avoided.

FIG. 7 shows one example of the electronic control apparatus according to this invention. Referring to FIG. 7, the arrangements of the first transistors 161, 162 and 163, second transistors 166, 167 and 168, transistors 164 and 169, and resistors 165 and 170 are the same as those of the first transistors 61, 62 and 63, second transistors 66, 67 and 68, transistors 64 and 69, and resistors 65 and 70 as described with reference to FIG. 6 above, respectively. Further transistors 171 and 172 have the emitters thereof connected to the first voltage source 13 through a resistor 174. The collector of the transistor 171 is connected to the second voltage source 12 through a resistor 173. The collector of the transistor 172 is connected to the base of the transistor 169. The base of the transistor 171 is connected to the common terminal 5 of the star-connection (star-connected stator windings), and the base of the transistor 172 is connected to a mid-point between resistors 175 and 176 which are series-connected between the first and second voltage souces 13 and 12 to divide the voltage difference therebetween (i.e. the mid-point 177 is a voltage dividing point between the two voltage sources). The currents which are to flow through the stator windings are determined by the base potential of the transistor 164. If the currents which are to flow through the stator windings are ideally driven differentially with full-wave signals so as not to cause partial overlaping between adjacent conduction periods, and if the multiphase loads are arranged symmetrically, the potential of the common terminal 5 does not change with a change of time. However, if there occurs a difference between the collector current controlled by the transistor 169 and the collector current controlled by the transistor 164, there occurs an overlapping time when currents flow in two adjacent loads (phases) at a time, resulting in a change of the potential of the common terminal 5. In order to avoid this undesired operation, according to this invention, the potential of the common terminal 5 and the potential of the point 177 are compared and amplified by the transistors 171 and 172, and by controlling the base current or collector current of the transistor 169 so as to make the potential of the common terminal equal to the potential of the point 177, an excellent differential amplifier circuit is realized.

FIG. 8 shows another example of the electronic control apparatus according to this invention. Referring to FIG. 8, first transistors 361, 362 and 363 have at the collectors thereof connected to the terminals of the star-connected stator windings (a, b and c phases) opposite to the common terminal 5 of the star-connection thereof, respectively, and also have the bases thereof connected to the collectors of a plurality of third transistors 261, 262 and 263, respectively, and further have the emitters thereof connected to a first voltage source 23. The second transistors 366, 367 and 368 have the collectors thereof connected to the terminals of the star-connected stator windings (a, b and c phases) opposite to the common terminal 5 of the star-connection thereof, respectively, and also have the bases thereof connected to the collectors of a plurality of fourth transistors 266, 267 and 268, respectively, and further have the emitters thereof connected to a second voltage source 22 through a current detecting resistor 301. The collector of a transistor 264 is connected to the respective emitters of the third transistors 261, 262 and 263, and the base of the transistor 264 is connected to the output terminal of an amplifier 302. The emitter of the transistor 264 is connected to the second voltage source 22 through a resistor 265. Regarding two input terminals of the amplifier 302, the (−) input terminal is connected to the emitters of the second transistors, and a current command signal (voltage) is applied to the (+) input terminal 303 of the amplifier 302.

A transistor 269 has the emitter thereof connected to the first voltage source 23 through a resistor 270, and also has the base thereof connected to the collector of a transistor 271. The transistors 271 and 272 have the respective emitters thereof connected to the second voltage source 22 through a resistor 274. The collector of the transistor 272 is connected to the first voltage source 23 through a resistor 273. The base of the transistor 271 is connected to the common terminal 5 of the star-connected stator windings. Series-connected resistors 275 and 276 are connected between the second and first voltage sources, and the mid-point 277 therebetween is a voltage dividing point for dividing the voltage difference between the two voltage sources. The base of the transistor 272 is connected to the mid-point 277. This circuit, which is an electronic control apparatus, of FIG. 8 achieves the same purpose as that of FIG. 7, and is advantageous because the loads are not directly driven by the differentially amplifying transistors, and the voltages of the voltage sources can be effectively utilized in the loads (of the motor), as compared with the circuit as shown in FIG. 7. The third transistors 261, 262 and 263, the transistor 264, the fourth transistors 266, 267 and 268, and the transistor 269 achieve differential amplifying operation in a manner similar to that done by the first transistors 161, 162 and 163, the transistor 164, the second transistor 166, 167 and 168, and the transistor 169 as described above with reference to FIG. 7. The currents which are to flow through respective stator windings are different from each other when there are differences in the degree of current amplification among the first or second transistors in FIG. 8. The amplifier 302 improves this undesired difference among the currents of said first or second transistors (i.e. unbalance of the currents). That is, the voltage detected by the current detecting resistor 301 and the command voltage applied to the (+) input terminal 303 of the amplifier 302 are compare and amplified, and the thus obtained voltage is applied to the base of the transistor 264. This is a feedback loop. By this feedback loop, currents in accordance with the potential of the (+) input terminal of the amplifier 302 which are not influenced by the variation of the degree of current amplification of the transistors 361, 362 and 363 or 366, 367 and 368 can be applied to the stator windings. In such a circuit, the current of the transistor 269 can also be controlled by the transistors 271 and 272 so as to make the potential of the common terminal 5 of the star-connection equal to the potential of the point 277. Therefore, the first and second transistors in FIG. 8 can achieve an excellent differential amplifying operation with full-wave signals. Since this operation is similar to that described above with reference to FIG. 7, no further explanation thereof will be made here.

As is apparent from the foregoing, according to this invention, currents to be supplied to star-connected multiphase loads can be supplied to the multiphase loads so as to keep the potential of the common terminal of the star-connection constant, and the currents through respective multiphase loads can be well balanced. Therefore, an excellent differential amplifying operation can be attained. According to the above-described examples of this invention, a three-phase motor is taken as an example of star-connected multiphase loads.

The following is apparent from the foregoing description. That is, the combination of the transistors 161, 162 and 163 in FIG. 7, and the combination of the transistors 261, 262 and 263 in FIG. 8 function as the first switching means described above. Similarly, the combination of the transistors 166, 167 and 168 in FIG. 7, and the combination of the transistors 266, 267 and 268 in FIG. 8 function as the second switching means described above. The voltage of the point 177 in FIG. 7, and the voltage of the point 277 in FIG. 8 function as the reference signals of the reference signal source described above. The base voltage of the transistor 171 in FIG. 7, and the base voltage of the transistor 271 in FIG. 8 function as the outputs of the voltage detector described above. The differential amplifier of the transistors 171 and 172 in FIG. 7 and the differential amplifier of the transistors 271 and 272 in FIG. 8 function as the first comparator including the first feedback amplifier described above. The combination of the transistor 164 and the resistor 165 in FIG. 7, and the combination of the transistor 264 and the resistor 265 in FIG. 8 function as the load current supplying means described above. The combination of the transistor 169 and the resistor 170 in FIG. 7, and the combinaton of the transistor 269 and the resistor 270 in FIG. 8 function as the feedback current draining means described above. The transistors 361, 362 and 363 in FIG. 8 function as the first load current amplifiers described above. The transistors 366, 367 and 368 in FIG. 8 function as the second load current amplifiers described above. The amplifier 302 in FIG. 8 functions as the second comparator including the second feedback amplifier described above. The resistor 301 functions as the load current detector described above.

As this invention is explained in the foregoing by using a brushless D.C. motor, only one switch among the first or second switching means is conductive at one time. However, plural switches among the first or second switching means may become conductive generally. In such a case, the current supplied through the load current supplying means by the command signal is drained naturally by the feedback current draining means, regardless of the mode of the switching means. Therefore, the first and second switching means may be operated by the timing signal generator generally.

Further, although the load current detector is coupled between the plurality of first load current amplifiers in FIG. 8, the load current detector can also be coupled between the plurality of second load current amplifiers. Further, the amplifiers driving the emitters of the transistors 166, 167 and 168, the transistors 266, 267 and 268, and the transistors 261, 262 and 263 do not necessarily have to have a high output impedance like the collectors of the transistors 169, 269 and 264 to achieve the differential operations because of the feedback loops. However, it is desirable that the amplifiers driving the emitters of the transistors 161, 162 and 163 have a high output impedance to achieve the differential operation.

What is claimed is:

1. An electronic control apparatus for controlling currents supplied to star-connected multiphase loads, comprising:
    a plurality of first switching means;
    a plurality of second switching means, one terminal of each of the loads opposite to the common terminal of the star-connection being connected to a corresponding one of said plurality of first switching means and to a corresponding one of said plurality of second switching means;
    a reference signal source for generating a reference signal;
    a voltage detector coupled to said common terminal of said star-connection for detecting the voltage of said common terminal;
    a first comparator coupled to said voltage detector and said reference signal source for providing an output signal equal to the difference between the output of said voltage detector and said reference signal source;
    a first feedback amplifier coupled to said first comparator for amplifying said output signal of said first comparator;
    load current supplying means coupled to said first switching means for supplying a current to said multiphase loads according to a command signal through said first switching means;
    feedback current draining means coupled to said first feedback amplifier and said second switching means; and
    a timing signal generator coupled to said plurality of first switching means and said plurality of second switching means for selectively switching said plurality of first switching means and said plurality of second switching means,
    whereby said feedback current draining means drains the current through said second switching means from said multiphase loads so as to keep the voltage at said common terminal of the star-connection constant or substantially constant regardless of the mode of said timing signal generator.

2. An electronic control apparatus as claimed in claim 1, wherein said load current supplying means has a high output impedance for supplying the current to said multiphase loads according to the command signal through said first switching means.

3. An electronic control apparatus as claimed in claim 1, which further comprises: a plurality of first load current amplifiers coupled respectively between said first switching means and said terminals of the star-connection opposite to the common terminal of the star-connection for amplifying the current supplied through said first switching means by said load current supplying means and providing the output current to said multiphase loads; and a plurality of second load current amplifiers coupled respectively between said second switching means and said terminals of the star-connection opposite to the common terminal of the star-connection for amplifying the current drained through said second switching means by said feedback current draining means and draining the output current from said multiphase loads.

4. An electronic control apparatus as claimed in claim 3, wherein said load current supplying means comprises: a second comparator; a second feedback amplifier coupled to said second comparator and said first switching means for amplifying the output of said second comparator and providing the current to said multiphase loads through said first switching means; and a load current detector coupled between said plurality of first load current amplifiers and said second comparator for detecting the total current of said multiphase loads, whereby said second comparator provides an output signal equal to the difference between the output of said load current detector and the command signal to provide the current to said multiphase loads according to said command signal through said first switching means.

5. An electronic control apparatus as claimed in claim 3, wherein said load current supplying means comprises: a second comparator; a second feedback amplifier coupled to said second comparator and said first switching means for amplifying the output of said second comparator and providing the current to said multiphase loads through said first switching means; and a load current detector coupled between said plurality of second load current amplifiers and said second comparator for detecting the total current of said multiphase loads, whereby said second comparator provides an output signal equal to the difference between the output of said load current detector and the command signal to provide the current to said multiphase loads according to said command signal through said first switching means.

6. An electronic control apparatus as claimed in claim 1, wherein said timing signal generator comprises means for generating signals such that only one of said plurality of first switching means and only one of said plurality of second switching means are switched on at a time.

7. An electronic control apparatus as claimed in claim 1, wherein said multiphase loads are phase windings of an electric motor and said timing signal generator is a commutating system of said electric motor.

* * * * *